(12) United States Patent
Hilger et al.

(10) Patent No.: US 9,258,977 B1
(45) Date of Patent: Feb. 16, 2016

(54) ASSEMBLY FOR COLLECTION AND DISPOSAL OF FELINE WASTE

(76) Inventors: Timothy W. Hilger, Rose Hill, KS (US); James Harrelson, Summerville, SC (US)

(*) Notice: Subject to any disclaimer, the term of this patent is extended or adjusted under 35 U.S.C. 154(b) by 397 days.

(21) Appl. No.: 13/102,276

(22) Filed: May 6, 2011

(51) Int. Cl.
*A01K 1/01* (2006.01)
*A01K 29/00* (2006.01)

(52) U.S. Cl.
CPC .............. *A01K 1/0125* (2013.01); *A01K 1/0107* (2013.01)

(58) Field of Classification Search
USPC ............................................. 119/161, 165–170
See application file for complete search history.

(56) References Cited

U.S. PATENT DOCUMENTS

| | | | | |
|---|---|---|---|---|
| 4,706,606 A * | 11/1987 | Coppola | 119/165 |
| 4,724,955 A * | 2/1988 | Martin et al. | 206/204 |
| 4,739,725 A * | 4/1988 | Fennelly | 119/168 |
| 4,801,006 A * | 1/1989 | Martin et al. | 119/170 |
| 5,220,885 A * | 6/1993 | Goetz | 119/165 |
| 5,295,632 A * | 3/1994 | Zink et al. | 229/198 |
| 5,449,610 A * | 9/1995 | Lillehoj | 435/7.24 |
| 5,566,641 A * | 10/1996 | Radli et al. | 119/168 |
| 5,701,845 A * | 12/1997 | Jablonski et al. | 119/166 |
| 5,755,182 A * | 5/1998 | Brown et al. | 119/166 |
| 5,799,610 A * | 9/1998 | Poulos | 119/166 |
| 5,832,869 A * | 11/1998 | Franczak et al. | 119/168 |
| 5,983,831 A * | 11/1999 | Thompson | 119/165 |
| 6,269,772 B1 * | 8/2001 | Mickey | 119/166 |
| 7,677,201 B1 * | 3/2010 | Eden | 119/165 |
| 2005/0028745 A1* | 2/2005 | Baillie et al. | 119/165 |

* cited by examiner

*Primary Examiner* — David Parsley
(74) *Attorney, Agent, or Firm* — Kenneth H. Jack; Davis & Jack, L.L.C.

(57) ABSTRACT

An assembly for collection and disposal of feline waste, the assembly including a first, a second, and at least a third upwardly opening vessel, each vessel among the first, second, and at least third vessels being substantially identical to each other vessel among the first, second, and at least third vessels, and each vessel among the first, second, and at least third vessels having a peripheral wall having an upper edge, each peripheral wall having an upwardly opening door notch; and including releasably attaching tab and slot combinations connected operatively to the first, second, and at least third upwardly opening vessels, the releasably attaching tab and slot combinations being adapted for, upon mirroring positioning of any two vessels among the first, second, and at least third upwardly opening vessels with respect to each other, holding those two vessels in a pet house configuration.

8 Claims, 6 Drawing Sheets

ASSEMBLY FOR COLLECTION AND DISPOSAL OF FELINE WASTE

FIELD OF THE INVENTION

This invention relates to consumer pet products. More particularly, this invention relates to cat litter boxes, trays, vessels, and the like.

BACKGROUND OF THE INVENTION

Enclosed cat litter boxes are known. However, such boxes typically comprise a lower plastic and non-disposable bottom half in combination with an upper plastic and non-disposable top half. While such boxes beneficially provide an enclosed environment favored by cats, such boxes disadvantageously require periodic internal cleaning, and they disadvantageously fail to facilitate any convenient means for disposal of soiled cat litter.

Disposable cat litter boxes are also known, such boxes typically comprising a cardboard or thin plastic upwardly opening tray. While such boxes help with handling and disposal of cat waste, such disposable cat litter boxes disadvantageously offer no structure forming a desirable pet house type enclosure.

The instant inventive assembly for collection and disposal of feline waste solves or ameliorates the problems of enclosed cat litter boxes and disposable cat litter boxes, as discussed above, while preserving the benefits and advantages of both, by providing pluralities of specially configured disposable vessels, each being capable of alternatively serving both as a feline waste container and as a mirroringly positionable overlying and underlying pet house forming structures.

BRIEF SUMMARY OF THE INVENTION

The instant inventive assembly for collection and disposal of feline waste preferably comprises a first, a second, and at least a third upwardly opening vessel. In the preferred embodiment, and for enhancement of economies in manufacturing, each vessel among said first, second, and at least third upwardly opening vessel is configured substantially identically with each other vessel. Preferably, each such vessel comprises a floor section surrounded peripherally by an upwardly extending wall, and each such vessel's peripheral wall presents an upwardly opening door forming notch. Die cut and foldable cardboard sheets constitutes a preferred configuration of each identical unit of the assembly.

The instant inventive assembly preferably further comprises releasable attaching means which are connected operatively to the first, second, and at least third upwardly opening vessels. Preferably, the releasable attaching means are adapted for holding pairs of vessels in a mirroringly overlying and underlying or "clamshell" position wherein the underlying vessel may serve as a cat litter tray, wherein the overlying vessel may serve as a pet house enclosure completing structure, and wherein vertically aligned peripheral wall sections may advantageously form a pet house doorway.

In use of the instant inventive assembly, an operator may initially place one of the vessels upon the floor and may pour granular cat litter therein. Thereafter, the operator may invert a second vessel, placing it over the first vessel in the mirroring or "clamshell" fashion. Thereafter, the releasable attaching means may be engaged to hold the two vessels in the resultant pet house enclosure configuration. Upon soiling of the cat litter by feline waste, the operator may disengage the releasable attaching means, removing the overlying vessel from the underlying vessel. Thereafter, the operator may simply dispose of the underlying vessel along with the soiled cat litter it contains. Thereafter, the vessel which was formerly used as an overlying pet house enclosure completing member may be inverted, and may be filled with new cat litter. Thereafter, a third vessel substantially matching the first two discussed above, may be inverted and may be mirroringly attached in the manner discussed above. Accordingly, each upwardly opening vessel component may economically serve both as a cat litter use and disposal container and as a pet house enclosure completing member.

Accordingly, objects of the instant invention include the provision of an assembly for collection and disposal of feline waste which includes and incorporates structural components as discussed above, and which arranges such structural components in relation to each other in manners described above for achievement of the beneficial functions discussed above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
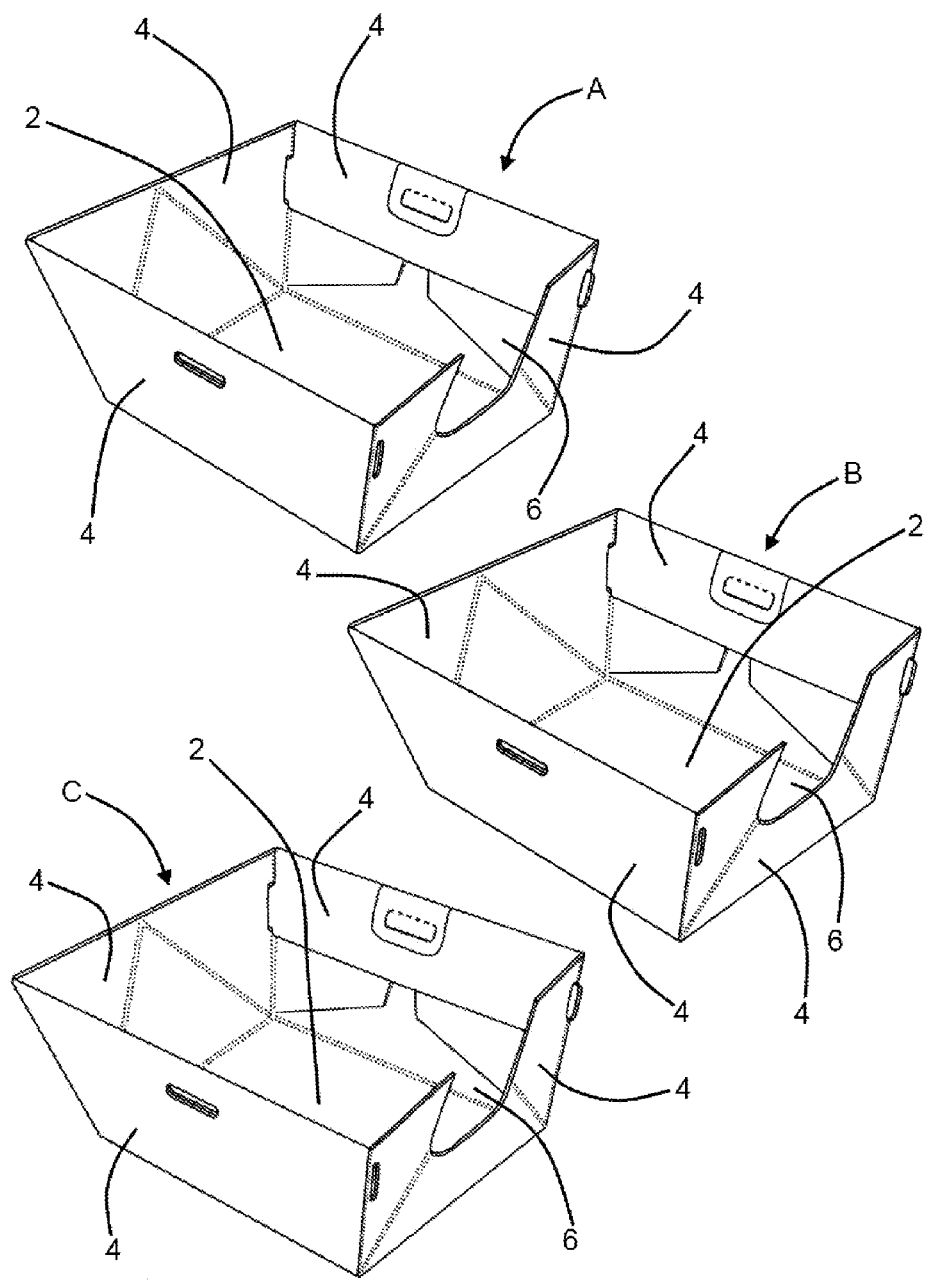
FIG. 1 presents perspective views of first, second, and at least third upwardly opening vessel components of the instant inventive assembly.

Referring now to the drawings, and in particular to FIG. 1, a preferred embodiment of the instant inventive assembly for collection and disposal of feline waste is referred to generally by Reference Arrows A, B, and C; reference Arrow A identifies a first upwardly opening vessel; reference Arrow B identifies a second upwardly opening vessel; and reference Arrow C identifies and represents at least a third upwardly opening vessel. In practice, the upwardly opening vessel C is representative of a plurality of or a continuing source of retail supply of identical renditions of upwardly opening vessel C.

As is shown in FIG. 1, each vessel among the vessels A, B, and C is preferably configured substantially identically with each other vessel. Each such vessel among A, B, and C preferably has a floor 2 and has a peripheral four sided wall 4. The longitudinally front portion of each of the peripheral walls 4 preferably presents an upwardly opening door notch 6. Preferred wall supporting structural components of the peripheral walls 4 are further discussed below.

Figure 2:
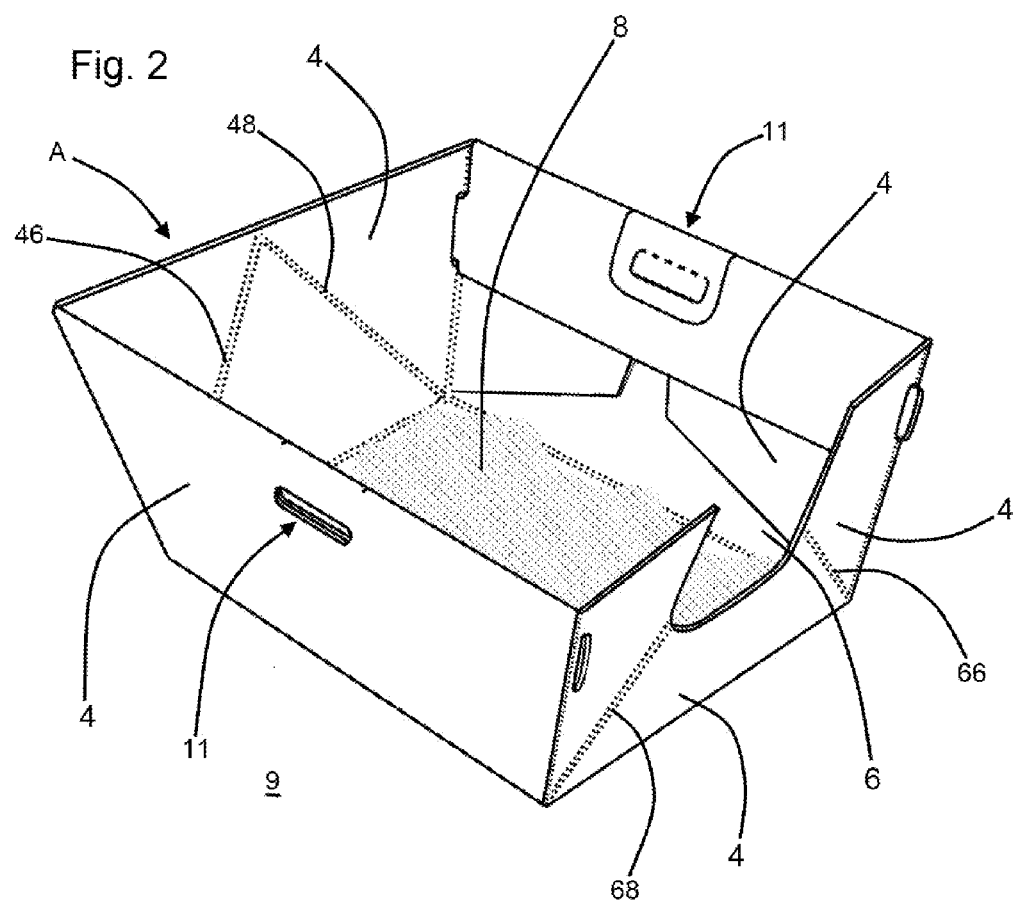
FIG. 2 redepicts vessel A of FIG. 1, the view of FIG. 2 additionally showing cat litter contained therein.

Referring simultaneously to FIGS. 1 and 2, an operator of the instant inventive assembly may initially place upwardly opening vessel A upon a floor surface 9, and the operator may thereafter pour a quantity of granular cat litter material 8 over the floor 2 of the vessel A. Thereafter, referring further simultaneously to FIG. 3, the operator may grasp upwardly opening vessel B, and the operator may invert such vessel, rotating it 180° about its longitudinal axis to assume the orientation depicted in FIG. 3. Thereafter, referring further simultaneously to FIG. 4, the operator may mirroringly place vessel B over vessel A in the "clamshell" configuration depicted. In such configuration, the upwardly opening door notches 6 of vessels A and B advantageously combine to form and define a doorway 10. In the mirroring clamshell position of the vessels A and B, said vessels advantageously form and function as an inviting pet house or enclosed cat litter box.

Figure 4:
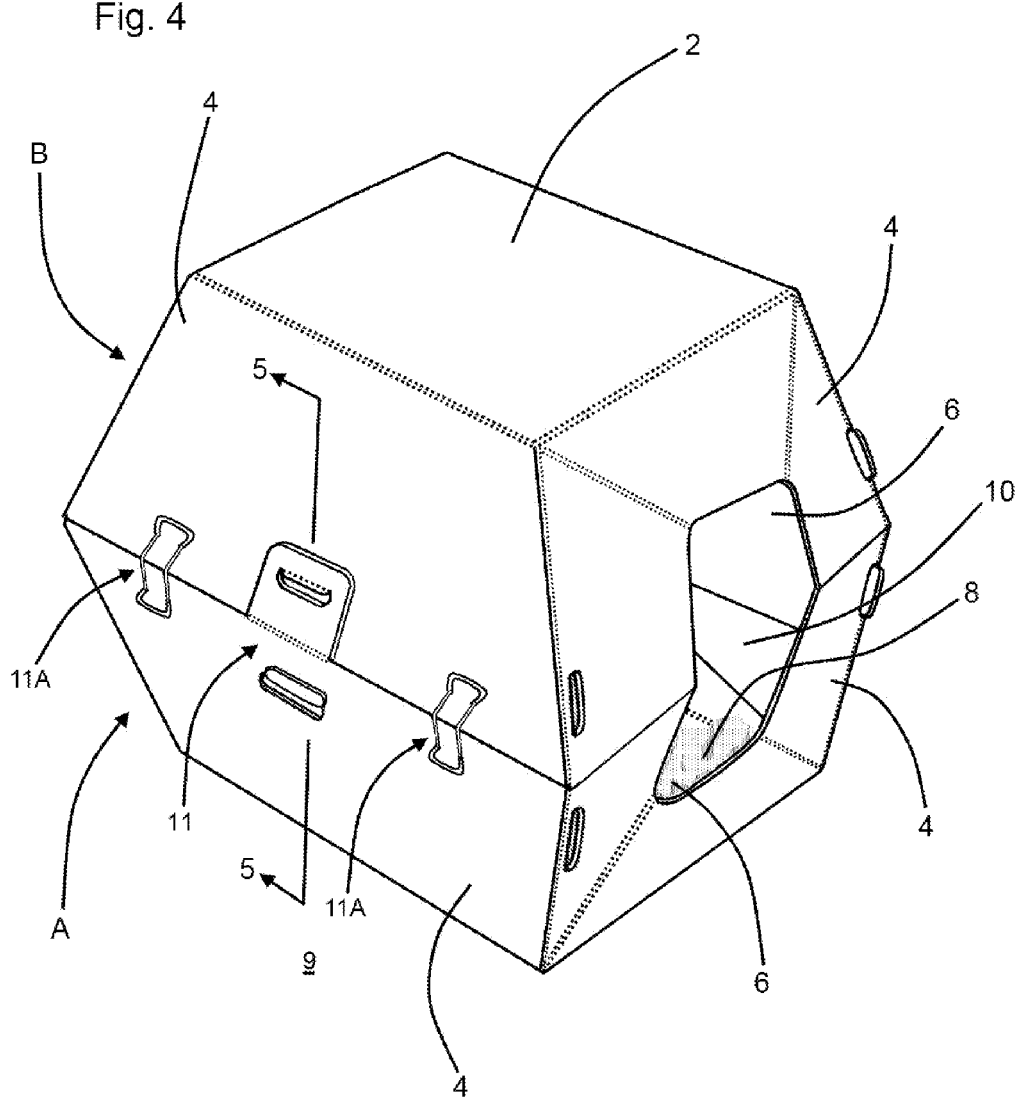
FIG. 4 redepicts the structures of FIGS. 2 and 3, the view of FIG. 4 showing the A and B vessels mirroringly positioned and removably attached to each other by alternative removable attaching means.

Referring simultaneously to FIGS. 1 and 4, the instant inventive assembly preferably further comprise releasable attaching means which are connected operatively to the first, second, and at least third upwardly opening vessels A, B, and C. In a preferred embodiment, the releasable attaching means comprise a plurality of attachment leaf, hook tab, and hook slot combinations 11 which are capable of releasably holding one of the vessels in relation to the other in the mirroring or clamshell pet house configuration. Alternatively, the releasable attaching means may comprise some other form of common releasable fastener such as "C" slot and elastic band combinations 11A. The attachment leaf, hook tab, and hook slot combination releasable attaching means 11 are preferred because they may be die cut from single cardboard sheets without the requirement of provision of any additional parts. Such preferred means are further described below.

Figure 3:
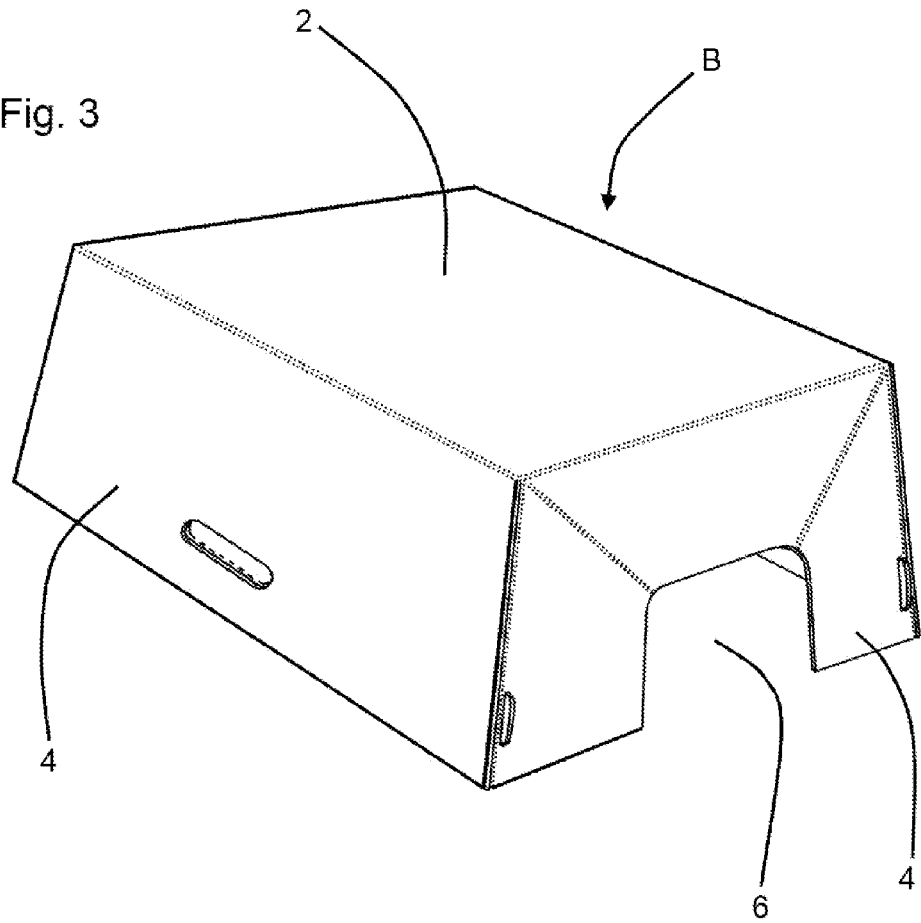
FIG. 3 redepicts vessel B of FIG. 1, the view of FIG. 3 showing vessel B in an inverted pet house enclosure completing orientation.

Referring simultaneously to FIGS. 2, 3, and 4, cat litter 8 within vessel A may eventually become soiled through cat use. In that event, the operator may disengage the releasable attaching means 11 or 11A, as the case may be, and may raise and temporarily set aside vessel B. Thereafter, the operator may press inwardly upon the vessel A's longitudinally forward and rearward walls 4, causing such walls to deflect inwardly in a pleating or folding fashion along provided cardboard folding score lines 46, 48, 66, and 68. Upon such inward folding or pleating, the releasable attaching means components of the vessels' lateral walls (tab and slot combinations 11 or slot and band combinations 11A, as the case may be) advantageously collapsed or are drawn laterally together for alternative engagement. Upon such lateral collapsing, the soiled vessel A is advantageously configured as a disposal container. For example, the same elastic bands used in combination 11A to hold vessels A and B in their clamshell configuration may be alternatively utilized for holding together the upper edges of the lateral and oppositely lateral wall sections of vessel A. Thereafter, the operator may simply dispose of the soiled vessel A. In a preferred embodiment, the inner surface of each of the vessels A, B, and C has a waterproof coating for prevention of transmission of moisture to floor 9.

Referring simultaneously to FIGS. 1 and 3, following cat litter disposal, the operator may invert vessel B for its successive alternative use as a lowermost vessel, and the operator may pour new cat litter therein. Thereafter, the operator may attach the at least third vessel C in an overlying and mirroring or clamshell fashion to re-form the enclosed pet house litter box. In the event that the at least third vessel C comprises, as preferred, a plurality of such vessels, the usage steps described above, may be advantageously and economically repeated to the extent of the available supply of the upwardly opening vessels C.

Figure 6:
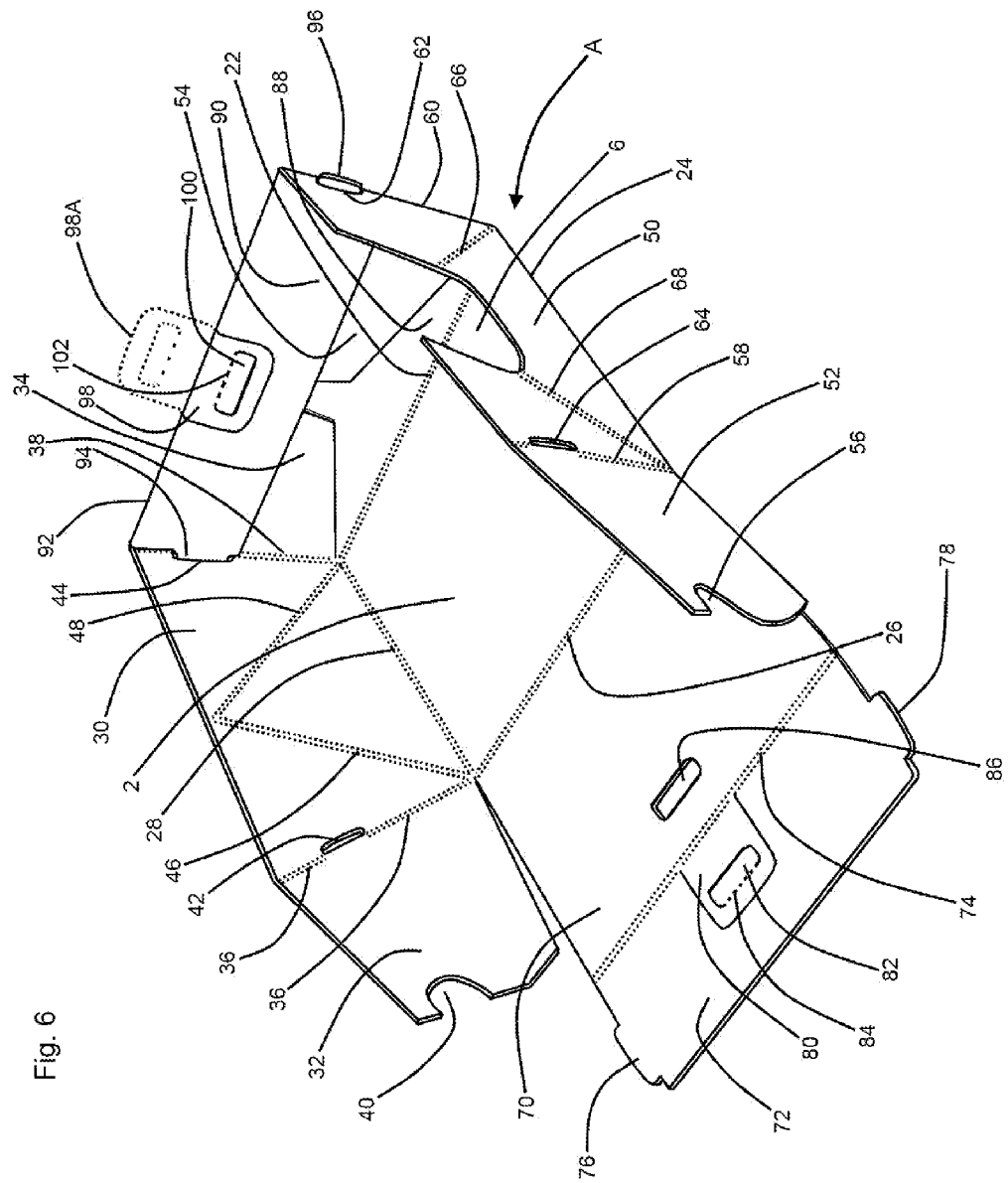
FIG. 6 presents a partially disassembled view of vessel A of FIG. 1.

Referring simultaneously to FIGS. 1 and 6, the floor section 2 of the upwardly opening vessel A is preferably rectangular, and is continuous with a longitudinally rearward wall section 30 of the peripheral wall 4. A folding score 28 is preferably pressed into the cardboard sheet at the transition between the floor section 2 and such wall section 30, the score 28 facilitating upward pivoting movement of section 30 with respect to section 2. The longitudinally rearward wall section 30 preferably includes lateral and oppositely lateral retained leaves 32 and 34, and folding score lines 36 and 38 are preferably impressed at the transitions between the wall 30 and retained leaves 32 and 34 for facilitating their forward pivoting movement. Tab slots 42 and 44 preferably open the wall section 30 at its lateral and oppositely lateral edges and connector clearance voids 40 are preferably interposed at the extreme lateral and oppositely lateral ends of the retained leaves 32 and 34.

Referring further to FIGS. 1 and 6, the peripheral wall 4 preferably further includes a longitudinally forward wall section 50 which is configured similarly with the longitudinally rearward wall section 30, the longitudinally forward wall section 50 being continuous with floor section 2 at score line 24 and continuous with lateral and oppositely lateral retained leaves 52 and 54 at score lines 58 and 60. Similarly with the longitudinally rearward wall section 30, tab receiving slots 64 and 62 open lateral and oppositely lateral edges of the wall section 50, and connector clearance voids 56 are interposed at the lateral and oppositely lateral ends of the retained leaves 52 and 54.

Referring further simultaneously to FIGS. 1 and 6, the peripheral wall 4 preferably further comprises a lateral wall section 70 which is continuous with floor section 2, a folding score 26 being interposed therebetween. A retainer leaf 72 is preferably continuous with the upper edge of the lateral wall section 70, a folding score 74 being interposed therebetween. Preferably, the longitudinally rearward and longitudinally forward ends of the retainer leaf 72 respectively present tabs 76 and 78 which, upon overfolding engagement of the retainer leaf 72 with the retained leaves 32 and 52, may respectively enter, engage with, and be securely held within tab receiving slots 42 and 64.

Referring further simultaneously to FIGS. 1 and 6, the peripheral wall 4 preferably further comprises an oppositely lateral wall section 88 which is configured similarly with the lateral wall section 70, a folding score 22 being interposed at the transition between floor section 2 and oppositely lateral wall section 88. A retainer leaf 90 is continuous with the upper edge of the oppositely lateral wall section 88 at folding score 92 and, similarly with the tabs of retainer leaf 72, forwardly longitudinal and rearwardly longitudinal tabs 96 and 94 may enter, engage with, and respectively hold at tab receiving slots 62 and 44. The peripheral wall 4 is securely held in its vessel forming position extending upwardly from the peripheral edges of floor section 2 via the inter-engagements of the retainer leaves 72 and 90 with retained leaves 32, 52 and 34, 54. Further engagement of tabs 76, 78, 94, and 96 with their respective tab receiving slots 42, 64, 44, and 62 provides further vessel forming support to the peripheral wall 4.

Figure 5:
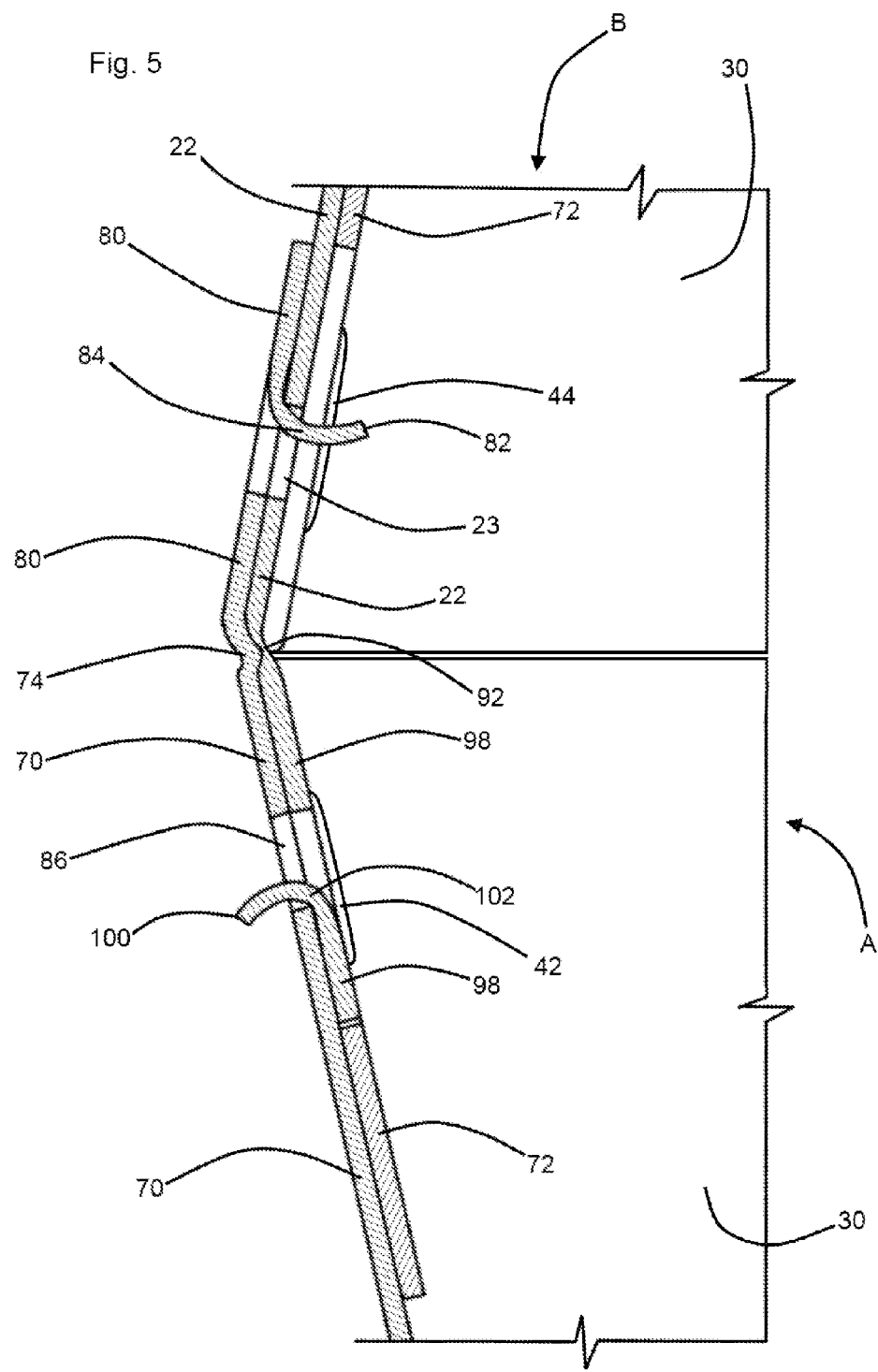
FIG. 5 is a partial sectional view as indicated in FIG. 4.

Referring simultaneously to FIGS. 4, 5, and 6, the pet house forming releasable attaching means 11 preferably comprise an attachment leaf 80 which is formed within the retainer leaf 72 via a "U" shaped die cut, the attachment leaf 80 being independently foldable with respect to the lateral wall section 70 along the common folding score 74. Such attaching means 11 preferably further comprise a hook tab 82 which is similarly formed within the attachment leaf 80 via a "C" shaped die cut, the hook tab 82 being foldable with respect to attachment leaf 80 along folding score 84. The oppositely lateral retainer leaf 90 preferably similarly presents a second attachment leaf 98 which presents a second hook tab 100 which is foldable along folding score 102. The second attachment leaf 98 may freely pivot along folding score 92 from the solid line position depicted in FIG. 6 to the alternative dashed line position 98A depicted in FIG. 6. Upon similar configuration of the retainer leaf 72, its attachment leaf 80 may similarly pivot upwardly.

Referring further simultaneously to FIGS. 4, 5, and 6, and in particular to FIG. 5, attachment leaves 80 and 98 are preferably pivoted upwardly (with respect to their vessels A and B) about their folding scores 74 and 92. Thereafter, hook tab 82 may be foldably extended along its folding score 84 to enter hook receiving slot 23, and hook tab 100 may be similarly foldably extended along its folding score 102 to enter hook receiving slot 86. The matching oval shapes of the hook tabs 82 and 100 and the hook receiving slots 23 and 86 advantageously allow hook tab edge surfaces close to fold lines 84 and 102 to frictionally engage and latch upon edge surfaces of the hook receiving slots 23 and 86. Upon such inter-engagement of tabs and slots, vessels A and B are securely and releasably held in the pet house configuration depicted in FIG. 4.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An assembly for collection and disposal of feline waste, the assembly comprising:
    (a) a first, a second, and at least a third upwardly opening vessel, each vessel among said vessels comprising a cardboard sheet having a floor section and a plurality of wall sections, the first, second, and at least third upwardly opening vessels' peripheral walls comprising said pluralities of wall sections, each of said vessels being configured substantially identically with each other vessel and each vessel's peripheral wall having an upper edge and an upwardly opening door notch;
    (b) mirroring releasable attaching means connected operatively to the first, second, and at least third upwardly opening vessels, the mirroring releasable attaching means being adapted for, upon mirroring positioning with respect to each other of any pair of vessels among the first, second, and at least third upwardly opening vessels, holding the paired vessels in a pet house configuration;
    (c) a plurality of retainer leaves having lateral and oppositely lateral surfaces, each retainer leaf's lateral and oppositely lateral surfaces facing away from each other and being positioned on opposite sides of said each retainer leaf, each retainer leaf among the plurality of retainer leaves being connected operatively to one of the wall sections among the plurality of wall sections; and
    (d) a plurality of "U" shaped die cut, attachment leaf, hook tab, and hook slot combinations, each of said combinations' "U" shaped die cuts extending from one of the retainer leaves' lateral surfaces to the oppositely lateral surface of said one of the retainer leaves, each of said combinations' hook tabs comprising a "C" slot within one of the attachment leaves, and each of said combination's hook tabs being extendable from said each combination's attachment leaf, each of said combinations' attachment leaves being extendable from the upper edge of one of the peripheral walls among the first, second, and at least third upwardly opening vessels' peripheral walls for engagement of said each attachment leaf's hook tab with a mirroring peripheral wall among the first, second, and at least third upwardly opening vessel's peripheral walls.

2. The assembly of claim 1 wherein, upon mirroring positioning of a pair of the vessels, pairs of combinations among the attachment leaf, hook tab, and hook receiving slot combinations become substantially vertically aligned for engagements of the hook tabs of one vessel among the pair with the hook receiving slots of the other vessel among the pair.

3. The assembly of claim 2 wherein, upon the mirroring positioning of the pair of vessels among the first, second, and at least third upwardly opening vessels, a pair of the upwardly opening door notches combine to define a doorway.

4. The assembly of claim 3 wherein each floor section comprises a water resistant coating.

5. The assembly of claim 3 wherein the peripheral walls' wall section pluralities are arranged in longitudinally and laterally opposing pairs, and wherein the longitudinally opposing wall section pairs are adapted for collapsing inwardly and for drawing together laterally opposing wall section pairs.

6. The assembly of claim 5 wherein the mirroring releasable attaching means are further adapted for extension from upper ends of the laterally opposing wall pairs, said further adaptation configuring the mirroring releasable attaching means for engagement with each other upon the drawing together of the laterally opposing wall section pairs.

7. The assembly of claim 6 wherein the longitudinal wall sections' adaptations for collapsing inwardly comprise scored fold lines.

8. The assembly of claim 1 wherein upon the mirroring positioning of the upwardly opening vessel pair, and upon an accumulation of feline waste within a lowermost vessel among said vessel pair, the mirroring releasable attaching means may release said lowermost vessel for disposal, and wherein a third vessel among the at least first, second, and third upwardly opening vessels may be mirroringly positioned with respect to the uppermost vessel among said pair to re-define the pet house configuration.

* * * * *